United States Patent [19]
Zhang et al.

[11] Patent Number: 6,008,470
[45] Date of Patent: Dec. 28, 1999

[54] METHOD AND SYSTEM FOR GAS METAL ARC WELDING

[75] Inventors: Yuming Zhang; Liguo E, both of Lexington, Ky.

[73] Assignee: University of Kentucky Research Foundation, Lexington, Ky.

[21] Appl. No.: 09/048,758

[22] Filed: Mar. 26, 1998

[51] Int. Cl.$^6$ .................................................. B23K 9/09
[52] U.S. Cl. ............................... 219/137 PS; 219/130.31; 219/130.51
[58] Field of Search .......................... 219/130.51, 130.31, 219/130.32, 130.33, 130.21, 130.1, 137 PS

[56] References Cited

U.S. PATENT DOCUMENTS

| | | |
|---|---|---|
| 3,683,149 | 8/1972 | Mages et al. . |
| 3,781,511 | 12/1973 | Ryglol . |
| 5,432,317 | 7/1995 | Church .............................. 219/137 PS |
| 5,473,139 | 12/1995 | Matsui et al. . |
| 5,525,778 | 6/1996 | Matsui et al. . |
| 5,643,479 | 7/1997 | Lloyd et al. . |

FOREIGN PATENT DOCUMENTS

| | | |
|---|---|---|
| 60-180674 | 9/1985 | Japan . |
| 60-180675 | 9/1985 | Japan . |
| 06285631 | 4/1993 | Japan . |
| 6142927 | 5/1994 | Japan . |
| 1215892 | 12/1970 | United Kingdom . |
| 2171267 | 8/1986 | United Kingdom ................ 219/130.1 |

OTHER PUBLICATIONS

Kovacevic et al.; On–Line Sensing of Metal Transfer for Adaptive Control of GMA Welding; 4$^{th}$ International Conf. on Trends in Welding Research; Gatlinburg, TN; Jun. 5–8, 1995.

Rhee et al.; Observation of Metal Transfer During Gas Metal Arc Welding Research Supplement; Oct., 1992; 381–S to 386–S.

Reutzel et al.; Derivation and Calibration of a Gas Metal Arc Welding (GMAW) Dynamic Droplet Model; Trends in Welding Research; Gatlinburg, TN; Jun. 5–8, 1995.

Jones et al.; The Temperal Nature of Forces Acting on Metal Arc Welding; Trends in Welding Research; Gatlinburg, TN Jun. 5–8, 1995.

Watkins et al.; A dynamic Model of Droplet Growth and Detachment in GMAW; Proceedings of the 3$^{rd}$ International Conference on Treands in Welding Research; 1992; Jun. 1–5.

Wang et al.; A New Close–Loop Droplet Transfer Control System in the Pulsed GMAW; AWS Annual Meeting, Apr. 1994; Philadelphia, PA.

Ueguri et al.; Study of Metal Transfer in Pulsed GMA Welding Welding Research Supplement; Aug. 1985; 242–S to 250–S.

Wang et al.; Arc Light Sensing of Droplet Transfer and its its Analysis in Pulsed GMAW Process; Welding Research Supplement; Nov. 1997; 458–S to 469–S.

(List continued on next page.)

*Primary Examiner*—Clifford C. Shaw
*Attorney, Agent, or Firm*—King and Schickli

[57] ABSTRACT

An improved method of gas metal arc welding (GMAW) is disclosed. The method includes utilizing a pulsed current having a variable waveform to ensure the detachment of one-droplet-per-pulse of current. During the welding process, the current is sufficient to produce a droplet at the end of a consumable electrode wire. After the droplet reaches a desired size, the current is lowered to induce an oscillation in the droplet. The current is then increased which, in combination with the momentum created by the oscillation, effects droplet detachment. The oscillation may be monitored by observing the arc voltage to determine a preferred detachment instant. A computer implemented method allows for the adaptive control of the current waveform to accommodate for anticipatable variations in the welding conditions, while maintaining ODPP transfer and a constant pulse period. An accompanying system is disclosed for implementing the method of adaptive welding.

15 Claims, 12 Drawing Sheets

OTHER PUBLICATIONS

Essers et al.; Arc Control with Pulsed GMA Welding; Welding Journal; Jun. 1984; 26–32.

Rhee et al.; Observation of Metal Transfer During Gas Metal Arc Welding; Welding Research Supplement; Oct. 1992; 381-S to 386-S.

Allemand et al.; A Method of Filming Metal Transfer in Welding Arcs; Welding Journal; pp. 45–47.

Jacobsen et al.; Monopulse Investigation of Drop Detachment in Pulsed Gas Metal Arc Welding; J. Phys. D. Appl. Phys. vol. 25; 1992; 783–797.

Siewert et al.; Through-the-Arc Sensing for Measuring Gas Metal Arc Weld Quality in Real Time; Materials Evaluation; Nov. 1992; 1314–1318.

Liu et al; Metal Transfer in Gas Metal Arc Welding Droplet Rate; Welding Research Supplement; Feb., 1989; 52–S to 58–S.

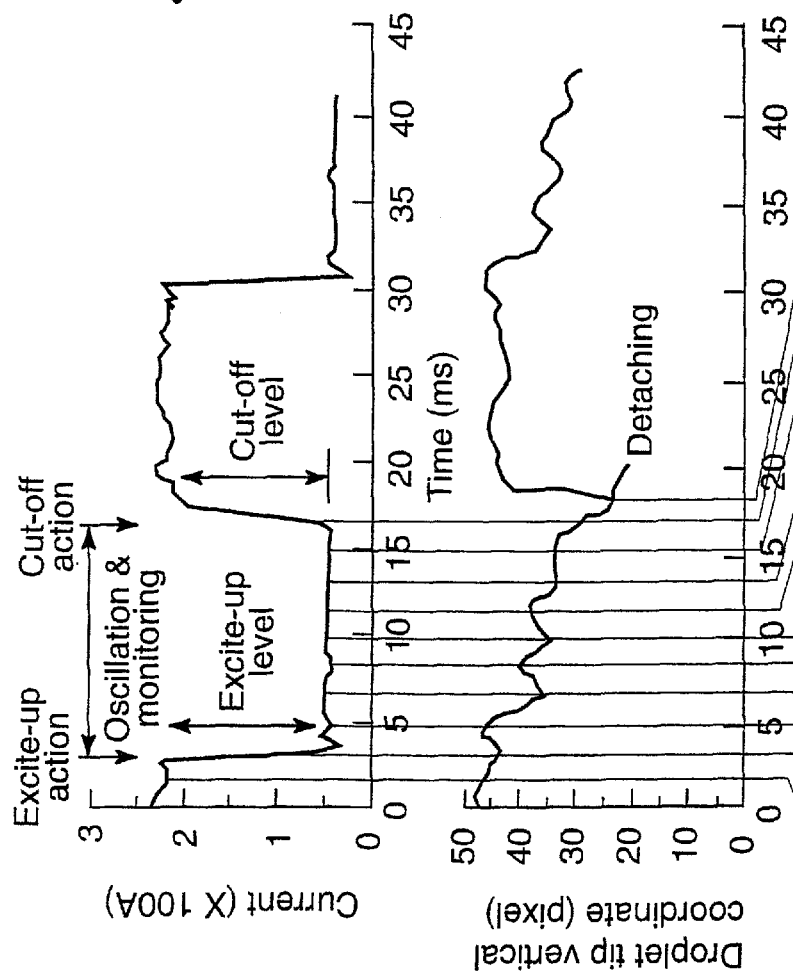
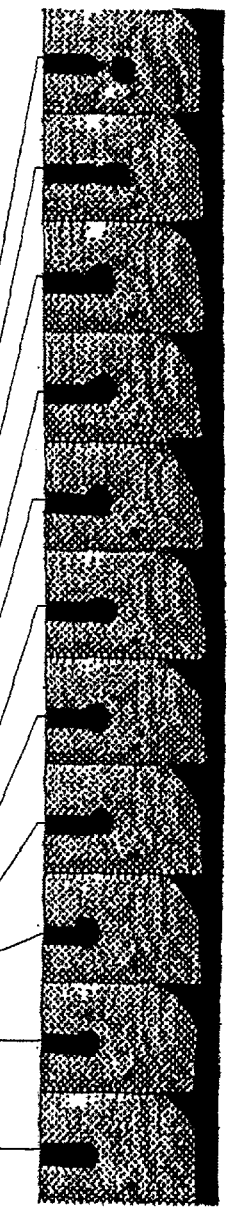
Fig. 3a
Fig. 3b

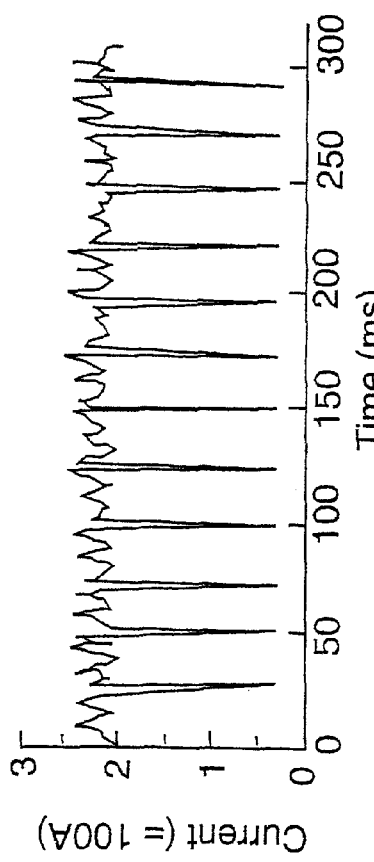
Fig. 5a
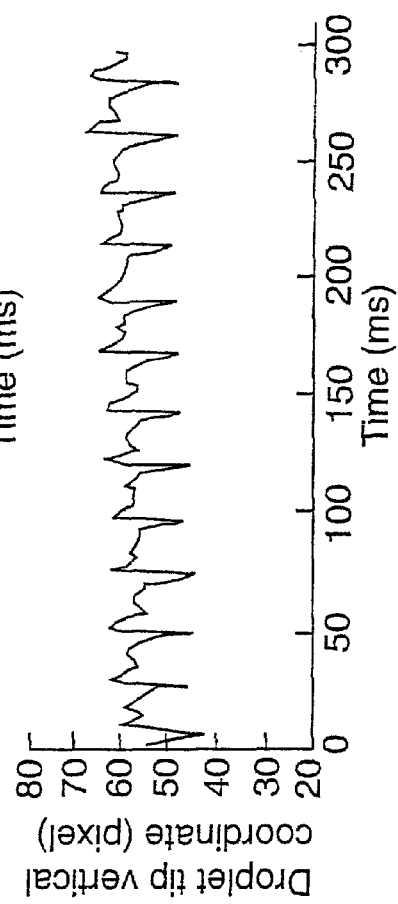
Fig. 5b
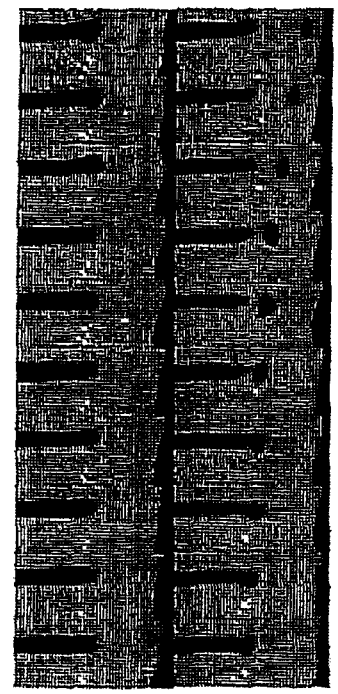

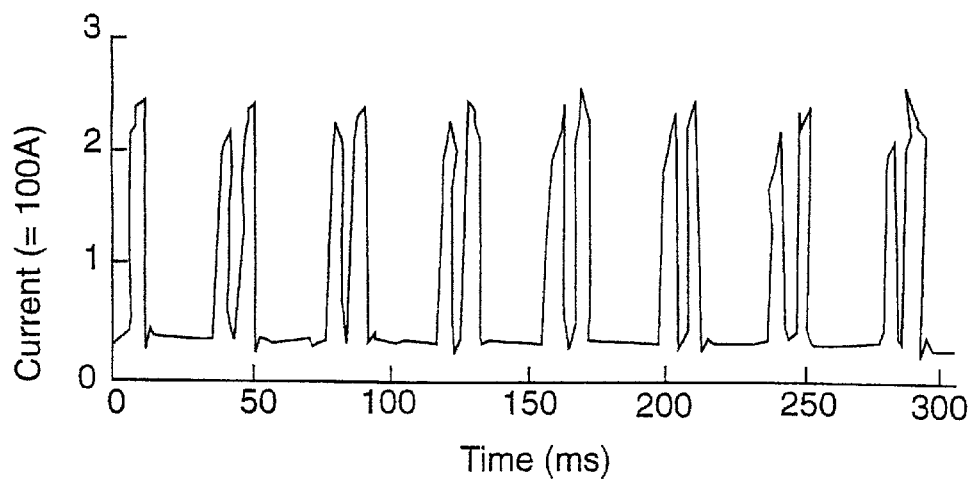
Fig. 6a
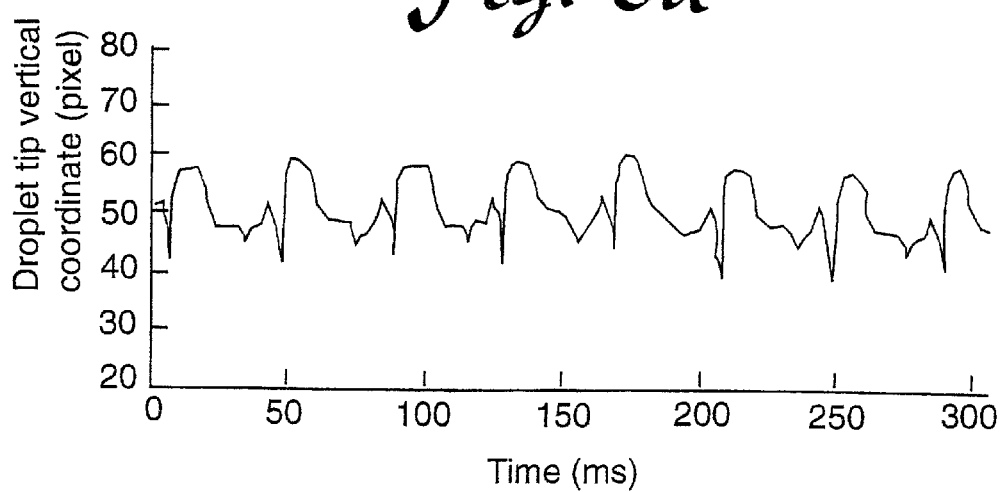
Fig. 6b
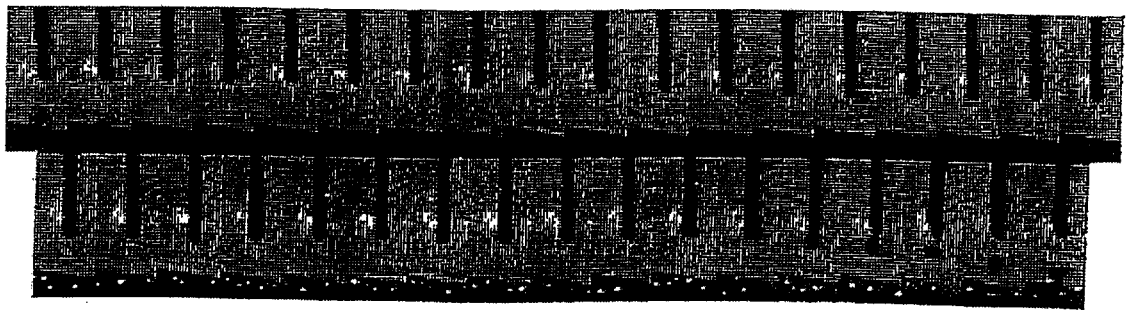

C-Welding Current

A-metal transfer process with 165 A of average current.

D-Droplet tip coordinate

B-metal transfer process with 165 A of average current.

METHOD AND SYSTEM FOR GAS METAL ARC WELDING

TECHNICAL FIELD

The present invention relates generally to the field of metal joining and, more particularly, to an improved method for gas metal arc welding (GMAW) using a pulse of current having a variable waveform and an accompanying system for implementing the method.

BACKGROUND OF THE INVENTION

In conventional gas metal arc (GMAW) or metal-inert gas (MIG) welding, an electric current is supplied to a consumable electrode wire to create an arc between the tip of the electrode and a workpiece. Heat created by the arc causes the tip of the electrode to melt, thereby forming a droplet of molten metal. Due to the combination of electromagnetic and gravitational forces present, the droplet ultimately detaches and transfers along the arc to the workpiece. The electric arc and the transfer of droplets from the electrode create a weld pool. As the workpiece is traversed, successive weld pools create a weld bead, which is essential to the metal joining process. Additionally, to improve bead quality, an inert gas is generally provided around the arc. This gas shield serves to protect the metal droplet from the surrounding atmosphere as it transfers across the arc, thereby preventing in-flight oxidation and providing a bead of substantially the same composition as the electrode.

To achieve quality beads with an acceptable appearance, it is desirable to control the detachment of the droplets from the electrode. More specifically, the droplets must continuously reach an optimum size and detach with a known frequency. As can be appreciated, the size of each droplet and the detachment frequency is directly dependent on the level of current supplied to the electrode. It is known that droplet size at the time of detachment decreases as the current increases. This is primarily due to the increased electromagnetic detachment force associated with an increase in current. However, it is equally well known that high currents may also cause droplet superheating, which is associated with poor quality beads due to damaged material property. Such high currents also increase the presence of undesirable fumes and directly affect the mode of droplet detachment and transfer.

It is known that free, or natural, droplet detachment and transfer generally occurs in one of three distinct modes depending on the current level: short-circuit, globular, or spray transfer. In short-circuit transfer, the current remains too low to detach the droplet through electromagnetic force together with the weight of the droplet (or alternatively, the distance between the electrode wire and the workpiece, also known as the arc length, is too short). Thus, the droplet simply grows at a slow rate until it ultimately contacts the weld pool and detaches. This causes a "short-circuit" between the electrode and workpiece. Of course, short-circuiting will lower the arc voltage to zero. To maintain the arc voltage at the set level, the current must be increased. When the droplet is transferred to the weld pool (that is, when the surface tension breaks the liquid metal neck between the weld pool and the electrode tip is broken), the large current will cause the neck to explode and create undesired spatters.

If the current is increased sufficiently to grow the droplet, but remains too low to effect detachment, globular transfer results. In this transfer mode, detachment occurs when the weight of the droplet together with the electromagnetic force simply overcomes the surface tension at the liquid-solid interface (that is, the neck created between the molten metal droplet and the solid, unmelted electrode tip). As can be appreciated, globular transfer results in natural, but uncontrolled detachment, which creates undesirable spatter provides an overly broad weld pool and a nonuniform weld bead. Such uncontrolled detachment is not acceptable for most manufacturing operations, especially where the use of automated or semi-automated welding machines is contemplated.

Further increasing the current results in spray transfer, which can be subdivided into drop (projected) spray or streaming spray. Drop spray results when the current is sufficiently high to detach each droplet having a diameter close to that of the electrode. This current is known as the "transition" current. Drop spray provides the desirable characteristics of uniform droplet size, regular detachment, directional droplet transfer, and also creates little spatter. This produces a more uniform bead.

When the current is increased beyond the transition current, the transfer mode becomes streaming spray. This high current creates small droplets having an increased detachment frequency, both seemingly desirable characteristics. However, this transfer mode is known to create an undesirable finger-shaped penetration in the weld pool that is associated with poor mechanical properties. Also, the use of such a high current increases the presence of undesirable fumes and in many instances causes droplet superheating.

From consideration of the above description, it is clear that the preferred mode of free, natural transfer is drop spray. However, it should also be appreciated that the range of current in which this transfer mode is consistently achieved is extremely narrow. Further complicating matters is the potential for variations in the welding conditions, such as the electrode material, the composition of the shielding gas, and the electrode extension. The combination of a high, but narrow current range and the interdependence on welding conditions create two significant problems, namely: (1) droplet detachment is not always guaranteed for a given set of preselected welding parameters; and (2) the high current and concomitant heat input prevent use of GMAW in workpieces having particularly thin sections or comprised of relatively heat-sensitive materials.

In an effort to solve the aforementioned difficulties, others have proposed the use of a pulsed current, a technique that is well-known in the art. In pulsed GMAW, a base current maintains the arc, while a higher, peak current melts the tip of the electrode wire and detaches the droplet. The combination of base and peak currents over the pulse period results in a lower average current. Of course, this reduces the amount of heat input to the weld pool which, in turn, solves the second problem identified above.

However, the more difficult problem is the ability to consistently achieve drop spray at a lower current independent of the welding conditions presented. In pulsed current GMAW, it is desirable to achieve the detachment of one-drop-per-pulse (ODPP). Conventional pulsed current methods attempt to achieve ODPP by adjusting the duration of the peak current. However, to guarantee detachment and drop spray (that is, to avoid one-droplet multiple pulses (ODMP) or multiple-drops-per-pulse (MDPP)) using conventional methods, such as the method taught in the U.S. Pat. No. 3,683,149 to Mages, the peak current level must always, at a minimum, rise to the transition current level, regardless of changes in duration (see FIG. 7, main amplitude 51 of Mages). Of course, this is a high current level which requires relatively high energy input and could potentially increase fumes. Further, since high current causes the droplet to form and transfer very quickly, the instant of droplet detachment remains difficult to accurately control. This is particularly true in adaptive welding. Specifically, as welding conditions (e.g. the arc length and composition of the shielding gas) and welding parameters (e.g. the base current level and duration) change over the course of the welding operation, the optimum level and duration of the peak current must also change in order to achieve ODPP.

Previous attempts to solve this difficulty include detecting the exact instant of droplet detachment and instantaneously adjusting the current accordingly to provide ODPP. Such proposals include: (1) sensing the arc voltage (arc length) and current level to determine the detachment instant; and (2) detecting audio emissions created by the arc jump from the tip of the electrode to the root of the droplet. Once the detachment instant is determined, the current can be lowered to below the transition current to ensure that only a single droplet is detached, thereby preventing MDPP. However, as can be appreciated, these approaches still rely on natural droplet transfer and, therefore, must always utilize a current at least as high as the transition current. Also, despite these efforts, uncertainty as to the detachment instant and the accompanying droplet size remains.

Accordingly, a need is identified for an improved method of GMAW using a pulsed current wherein the detachment of one-drop-per-pulse may be actively controlled. The method would utilize current levels below the transition current to effect droplet detachment, thereby avoiding the problems associated with the use of high current. Additionally, a computer-implemented method of adaptive welding and an accompanying system would allow for the on-line adjustment of the current waveform to compensate for anticipatable variations in welding conditions.

SUMMARY OF THE INVENTION

It is therefore a primary object of the present invention to provide a method of GMAW utilizing a current below the transition current to detach one-drop-per-pulse, thereby overcoming the above-described limitations and disadvantages of prior art methods.

An additional object of the present invention is to provide a method of GMAW that actively controls droplet detachment and is fully responsive to changes in welding conditions.

Still another object of the present invention is to provide a method of GMAW that relies on the momentum created by droplet oscillation and electromagnetic forces to effect droplet detachment.

Yet another object of the present invention is to provide a method of GMAW that is easy to implement using existing welding equipment.

An additional object of the present invention is to provide a method of GMAW that monitors the arc voltage during the oscillation of the droplet to determine a detachment instant.

Still a further object of the present invention is to provide a computer-implemented method of adaptive welding that compensates for anticipatable variations in welding conditions, while detaching one-drop-per-pulse and maintaining a constant droplet transfer frequency.

Yet a further object is to provide a system for implementing the method of adaptive welding.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method of gas metal arc welding using a variable current to actively control droplet detachment is provided. In the broadest aspects of the invention, the method includes the steps of supplying a current to form a droplet at the end of the electrode, lowering the current to induce an oscillation in the droplet, and raising the current to detach the droplet. As will be appreciated after reviewing the following disclosure, the method of the present invention advantageously allows for droplet detachment to be actively controlled, while avoiding the above-described limitations and difficulties associated with prior art methods.

For convenience of discussion, the method may be divided into three distinct periods, namely: a growth period in which the droplet is formed, an oscillation period in which the droplet is excited, and a detachment period wherein the droplet is actively forced from the electrode. During the growth period, a pre-determined first, peak current is supplied to the electrode. This current is sufficient to form a molten droplet at the end of the electrode, but is below the transition current (i.e. the current sufficiently high to independently promote or cause droplet detachment at a diameter close to the electrode in the absence of other forces). This current is maintained until the droplet grows to the desired size, which is preferably close to the diameter of the electrode to ensure drop spray transfer.

When the preferred droplet size is reached, the pulse enters the oscillation period. Specifically, this includes the step of lowering the current to a second, base level. The reduction in current excites the droplet to oscillate. The primary amplitude of this oscillation is in a direction toward and away from the workpiece. Advantageously, the amplitude of this oscillation may be determined by monitoring the arc voltage, which varies according to the changes in arc length caused by the movement of the droplet toward and away from the workpiece.

During the oscillation, at a selected instant in time when the droplet is moving toward the workpiece with a sufficiently high amplitude, as experimentally determined by monitoring the arc voltage, the method enters the detachment period. At this time, the current is increased to higher than the base current, but still below the above-referenced transition current. This increase in current produces an increased electromagnetic force on the droplet which, coupled with the momentum created by oscillation, serves to effect detachment. The method is then repeated to detach a succeeding droplet, thereby forming the weld pool together with the electric arc and, as the workpiece is traversed, the weld bead.

Thus, as can now be appreciated, the present method advantageously permits droplet detachment to be actively controlled by varying the current supplied to the electrode while simultaneously maintaining the current at a level below the transition current at all times. This allows the droplets to be detached at a desired size and at exact, selected instants in time, while avoiding the creation of deleterious fumes and the other problems associated with the use of high currents that is characteristic of prior art GMAW methods (e.g. high current usage, imprecise droplet control, spatter, poor bead quality). Of course, the use of a lower current also reduces the average current which, in turn, decreases the heat input to the weld pool. This avoids superheating conditions and allows for relatively thin sections of workpiece and heat-sensitive materials to be effectively welded.

However, depending on the welding conditions or parameters required for a particular operation, the duration of the peak and base currents for each pulse may require adjustment to control the average current. For example, if the heat input must decrease due to changes in the thickness of the workpiece, the average current must decrease. Of course, to decrease the average current, either the lower base current must endure for a longer period or the higher peak current for a shorter period. However, changing the duration of the current alters the pulse period which, in turn, increases or decreases the droplet transfer frequency. Such a non-constant transfer frequency is undesirable for some manufacturing operations, such as, for example, droplet-based manufacturing (DBM).

To achieve a constant droplet transfer frequency, it is intuitive that the pulse period must remain substantially constant. Therefore, in accordance with an important aspect of the present invention, a computer-implemented method of adaptively controlling the current waveform during the welding operation in response to changes in the welding conditions is provided. Specifically, by monitoring the arc voltage at different points in the pulse period, the level of current and the duration of the periods of current (i.e. the waveform) may be adjusted to maintain system stability. Additionally, the method advantageously incorporates the active control steps of the above-described method and, thus, ensures ODPP transfer.

The method of adaptive control incorporates the steps of the above-described active control method. These include the steps of (a) supplying a current during a growth period to grow the droplet, (b) lowering the current during an oscillation period to induce an oscillation in the droplet and (c) raising the current during a detachment period to detach the droplet. In addition to these periods, the pulse waveform is now further split to include an adjustment period, wherein the level and the duration of the current may be varied to provide for desired increases or decreases of the average current as necessary in order to compensate for changes in the welding conditions.

As described above, during the growth period, the current is at a peak level for a specified duration to grow the droplet to a desired size. This duration is determined by pre-set values for an initial arc voltage, wire feed speed, and pulse parameters, such as a peak current and base current level. At the end of this period, but during application of the peak current, the arc voltage is sampled. Then a second, or oscillation, period begins wherein the current is lowered to induce an oscillation in the droplet. While the level of current during this second period is dictated by the principles of the above-described active control method (i.e. the excite-up level) and is experimentally pre-determined, the duration of the current is non-constant. Advantageously, this allows for the beneficial amplitude of oscillation to develop, despite variations in the size of the droplet. The detachment period follows wherein the current is increased to a pre-determined level, preferably at or near the peak level, for a fixed duration. As described above, the amplitude of droplet oscillation toward the workpiece functions in combination with the resulting increased electromagnetic force to detach the droplet from the electrode.

Prior to repeating this cycle, the step of determining the difference between the arc voltage sampled after the growth of the droplet (i.e. at the peak current) and the pre-set, first arc voltage is performed. Based on this difference, an average current is determined that will maintain the arc voltage at a substantially constant level. This level and duration of the current are then implemented during a fourth, or adjustment, period to maintain the average current. However, it should be appreciated that the current level remains below the transition current and the duration of the period is always kept substantially constant, varying only to compensate for the slight variations in the duration of the oscillation period that are necessary to compensate for differences in droplet size/oscillation frequency. Upon adjusting the waveform accordingly, the process is then repeated with the first growth period having a pre-set peak current and duration necessary to form the droplet. This is then again followed by the sensing of the arc voltage substantially at or near the end of this period.

Thus, as should now be appreciated, by utilizing the above-described method, a constant droplet transfer frequency is achieved. Moreover, the adjustment of the current level/duration during the variable periods advantageously allows the system to adapt to changes in welding conditions, as determined by monitoring the arc voltage. Experiments have determined that a constant frequency is maintained despite significant changes in the wire feed speed or distance between the guide tube and the workpiece. Also, the method and system utilize the active control principles of the above-described method and, therefore, ensure that one-droplet-per-pulse transfer is achieved.

In accordance with another important aspect of the present invention, a system for implementing the method of adaptive welding is provided. In addition to the standard equipment of a power supply for providing current to an electrode wire and a wire feed controller for varying the feed speed of the electrode, the system includes a controller that senses the arc voltage and adjusts the current waveform in accordance with the principles of the method just described. More specifically, and within the broadest aspects of the invention, the controller allows the operator to input initial parameters, including a first arc voltage. Based on the initial parameters, the current waveform necessary to implement the active control method and grow the droplet to the desired size, induce oscillation, and effect detachment is determined by the controller. Upon growing the droplet, the controller senses a second arc voltage and, based on the difference in voltage between this second voltage and the first arc voltage, determines an average current necessary to maintain the arc voltage substantially constant. The controller then adjusts the current to induce an oscillation in the droplet. During this oscillation, the arc voltage is sensed by the controller to determine a detachment instant. At the detachment instant, the current is increased to detach the droplet. The controller then determines the waveform of current necessary to maintain the calculated average current and implements the same, thereby ensuring system stability to variations in welding conditions that would otherwise affect the arc length and lead to system failure.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and, together with the description, serve to explain the principles of the invention. In the drawings:

FIGS. 3a and 3b are graphs of the current level and vertical coordinate of the droplet over time, showing the basic operation of the method of the present invention;

FIGS. 4a, 4b and 5a, 5b are similar graphs showing the experimental results of the effect of peak current duration on droplet size and transfer frequency, as set forth in Example 2;

FIGS. 6a and 6b are similar graphs showing experimental results, including the addition of a base current duration after the peak current to reduce the average current (heat input), as set forth in Example 3;

Reference will now be made in detail to the present preferred embodiment of the invention, an example of which is illustrated in the accompanying drawings.

DETAILED DESCRIPTION OF THE INVENTION

Figure 1:
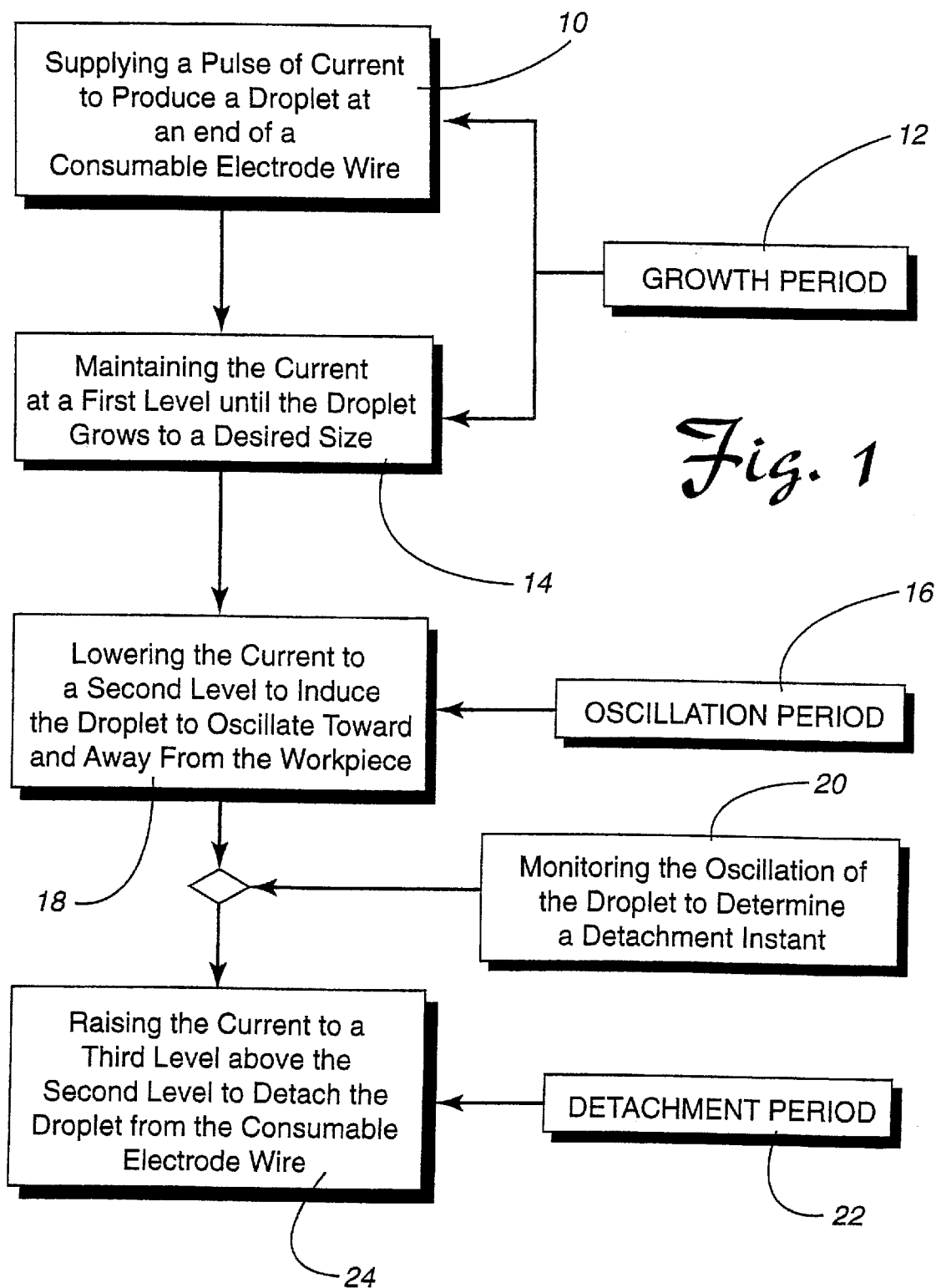
FIG. 1 is a block diagram showing the steps of a preferred embodiment of the method of the present invention.

Reference is now made to FIG. 1, showing the steps of the improved GMAW method of the present invention. In the preferred embodiment, the method includes the initial step 10 of supplying a pulse of current to a consumable wire electrode to form a droplet at the tip, which may also be termed the growth period 12 for convenience of discussion. More specifically describing the growth period 12, the current is supplied and maintained 14 at an experimentally pre-determined first level (e.g. 220–250 amperes) for a specified duration to produce a desired size, or diameter, of droplet for a given electrode material/diameter. Preferably, this level and duration of current are sufficient to create a droplet that meets the condition $0.8 \leq D_d/D_w \leq 1.4$, wherein $D_d$ is the diameter of the droplet just prior to detachment and $D_w$ is the diameter of the electrode wire.

When the preferred droplet diameter is reached, the method enters the oscillation period 16. Specifically, this includes the step 18 of lowering the current to a second, base level (e.g. 40–50 amperes) to cause the now fully-formed droplet to oscillate. The difference between the peak level and the base level of current is termed the "excite-up" level, as this is the amount of current drop required to sufficiently excite the droplet to oscillate. Preferably, the welding operation is conducted with the workpiece in a substantially horizontal position. Thus, the direction of the oscillation of the droplet is primarily toward and away from the workpiece. As discussed further below, in the preferred embodiment, the step 20 of monitoring the oscillation of the droplet may also be included.

When the droplet is moving toward the workpiece at or near its highest, or beneficial, amplitude, the method enters the detachment period 22. During this period, the step 24 of increasing the current to a third, or "cut-off" level is performed. This "cut-off" level is higher than the base current and preferably at or substantially near the first, peak current level. The concurrence of the current increase and beneficial amplitude is called the "phase match," and represents the instant in time when the electromagnetic force and momentum of the oscillation toward the workpiece are sufficient to effect detachment of the droplet from the electrode.

Thus, in principle, the method advantageously relies primarily on the momentum of the oscillating droplet to utilize current levels below the transition current to cause droplet detachment, thereby avoiding the problems associated with high currents. Also, because the detachment is actively controlled by making simple adjustments to the level and duration of the current, ODPP can be consistently achieved.

In addition to the condition of inducing oscillation to effect droplet detachment, it should be appreciated that to consistently achieve ODPP using the above-described method, certain conditions must be satisfied. More particularly, it is known that the frequency of oscillation for a liquid droplet attached to a stationary object, such as a wire electrode, depends primarily on the mass of the object. Due to the fact that the droplet diameter at the time of detachment is preferably kept substantially constant using the above-described method (e.g. $0.8 \leq D_d/D_w 1.4$), the approximate mass of the droplet is always known. Thus, as should now be appreciated, the oscillation frequency remains fixed for a given set of welding conditions and a peak current level and duration.

However, it has been experimentally determined that the amplitude of oscillation is directly dependent on the current differential caused by the switch from a higher to a lower level (i.e. the excite-up level) and, thus, is not fixed. As previously noted, the method of the present invention relies primarily on the amplitude of oscillation to effect droplet detachment. Thus, an important condition for consistently achieving the transfer of one-drop-per-pulse using the above-described methodology is that the droplet must be moving toward the workpiece with an amplitude sufficient to effect detachment upon switching the current to the cut-off level.

It is known that at a certain time after switching the current to the base level, the droplet oscillation reaches a high, or beneficial, amplitude toward the workpiece.

However, as the current endures, damping occurs and the oscillation decays. It has been experimentally determined that if the current is increased prior to or significantly after this beneficial amplitude occurs, regular droplet detachment is not achieved. Thus, the current must increase at or near the point in time when the beneficial amplitude occurs to ensure that the phase match condition is met.

Therefore, to control the exact time when the phase match occurs and ensure that ODPP transfer is consistently achieved, experiments are conducted wherein the oscillation of the droplet is precisely monitored (as noted by reference numeral 20 of FIG. 1) to determine the exact instant when this beneficial amplitude occurs for a given set of welding conditions. To do so, an image processing system including one high-frame rate camera (i.e. up to 3000 frames per second) and a laser-optic system are utilized in conjunction with a host computer, as is described in further detail below.

Specifically, utilizing the image processing and laser-optic systems, data on the droplet geometry and vertical coordinate may be transferred real-time into the host computer, which can simultaneously process successive images. Hence, the direct, real-time feedback of the droplet geometry can be obtained. This permits the operator to evaluate the droplet oscillation and, thus, accurately determine the exact instant when the phase match condition occurs. Of course, once the ideal detachment instant is determined for a set of welding conditions, the method may be implemented without the monitoring step.

Although the above-described image processing and laser-optic systems are of particular benefit in determining the exact instant of droplet detachment, it should be appreciated that these systems are somewhat costly to operate and are relatively complex in design. Therefore, it is also contemplated that the monitoring of the droplet can occur by simply measuring the arc voltage signal.

More specifically, after the current is lowered from the peak to the base level, the droplet is known to have a maximum size. As this produces a known vertical distance between the droplet and the workpiece, the arc voltage can be determined. Of course, during the oscillation period, the droplet is moving toward and away from the workpiece which creates a difference in this distance, which is known to be directly proportional to the arc voltage. Thus, by monitoring the change in the arc voltage during oscillation, the relationship between the duration of the oscillation and the arc voltage can be experimentally determined. This allows the operator to determine the exact instant when the beneficial amplitude occurs/is established. As modern welding systems are generally provided with the ability to measure the arc voltage during the welding operation, no additional equipment is thus necessary to perform this monitoring.

In addition to phase match, it has also been determined that the cut-off level must be sufficient to detach the droplet. More specifically, the current must reach a level that will generate the required increase in electromagnetic force that, combined with the momentum created by the beneficial amplitude, will forcibly detach the droplet from the electrode at the desired instant. Of course, for a lower beneficial amplitude (i.e. a higher droplet mass or a longer base current duration), a higher cut-off level is required, and vice-versa. In the preferred embodiment, the cut-off level and excite-up currents are maintained at approximately the same level to ensure that droplet detachment is consistently achieved. However, it should be appreciated that for a given set of welding conditions, a more precise, and perhaps lower, cut-off level can be experimentally determined through trial and error.

EXAMPLES

Figure 2:
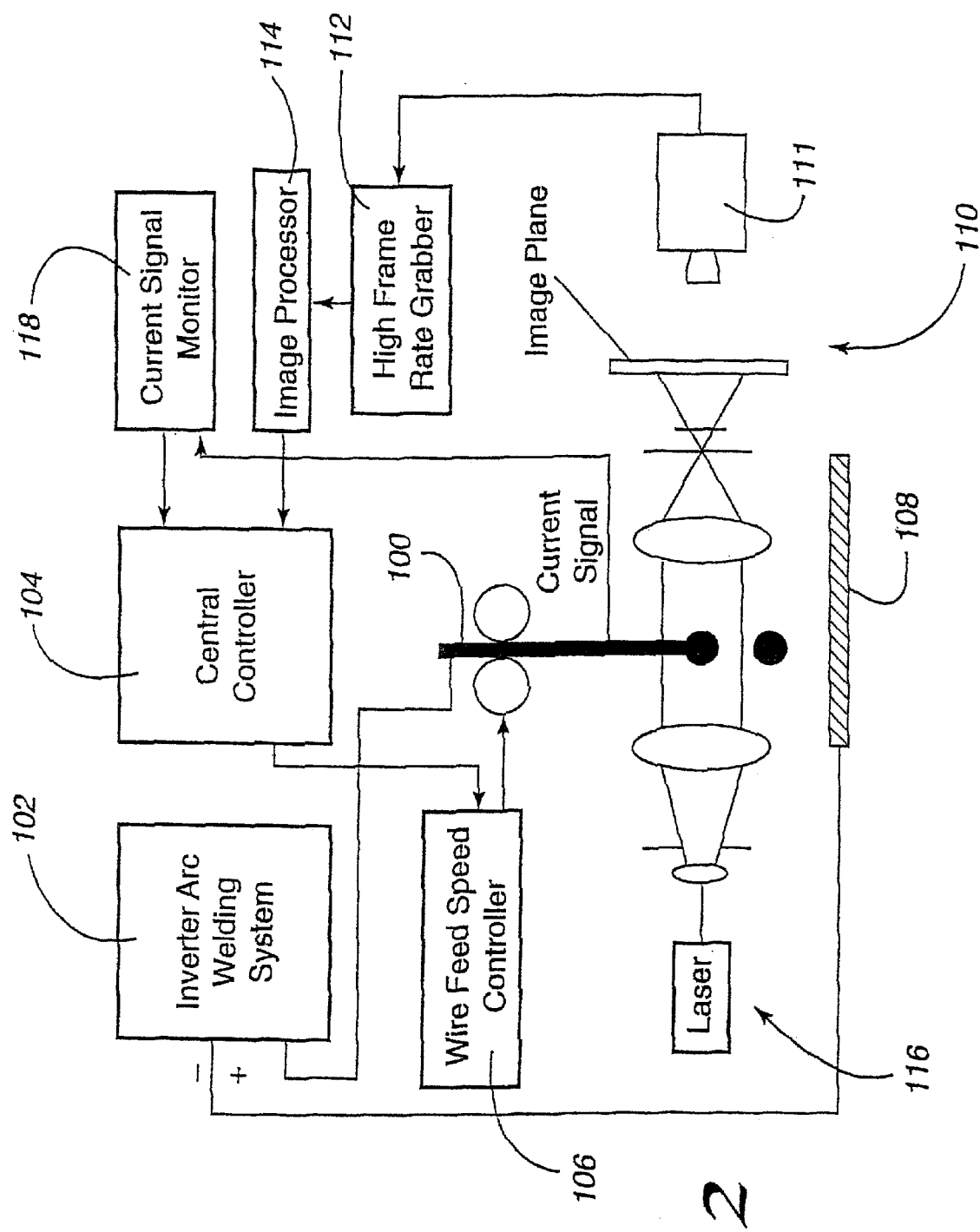
FIG. 2 is a schematical representation of a preferred embodiment of a system for performing the method of the present invention, including conducting the experiments set forth in Examples 1–4.

Referring now to FIG. 2, the experimental set-up utilized to confirm the viability of the method of the present invention is shown. A consumable wire electrode 100 comprised of mild steel and having a diameter of about 1.2 millimeters is used. The power supply 102 is an inverter arc power source of a type known in the art, such as a Miller's Maxtron 450 produced by the Miller Electric Manufacturing Company of Appleton, Wis. In constant current mode (as opposed to constant voltage), this power supply 102 provides between 15 and 565 amperes of current.

The current level is controlled by a central controller 104, such as an IBM Compatible host computer with media input capabilities that allow computer program instructions to be loaded thereon. By way of example only, a specific version of a computer program that can be used to implement the method of the present invention is noted below.

The controller 104 signals the power supply 102 to change the current provided to the electrode to perform the method of the present invention. The changes in current are based both on information supplied by the operator, such as the welding parameters, as well as information on the welding conditions fed back to the controller 104 during the welding operation (see below).

A wire feed speed controller 106 connected to the central controller 104 serves to feed the electrode wire towards the workpiece 108. For these experiments, the extension of the electrode toward the workpiece 108 is set at 16.5 millimeters. The shielding gas (not represented in FIG. 2) is preferably a mixture of 95 percent argon and 5 percent carbon dioxide. The arc voltage levels are maintained at approximately 25 volts for this mixed shielding gas, although the use of a different shielding gas/arc voltage is also possible using this experimental set-up (e.g. pure argon with an arc voltage of 30 volts).

One disclosed embodiment of a system that may be used to experimentally determine the phase match condition is a real-time image processing system 110 which monitors the amplitude of droplet oscillation. The system includes a camera 111 having a frame rate of up to 3000 Hz. The images obtained by the camera 111 are fed real time (i.e. 800–1500 frames per second) to the controller/host computer 104 through a high frame rate grabber 112 and an image processor 114 of a type known in the art. Also, a laser-optic system 116 similarly known in the art is connected to the controller/host computer 104 to allow the vertical coordinates of the droplet to be monitored both prior to and during oscillation. However, as discussed below in Example 5, use of such an image processing system/laser optic system may be avoided by simply sensing variations in the arc voltage during oscillation to determine when the beneficial amplitude and, thus, the desired detachment instant occurs.

A current signal monitor 118 may also be provided which serves to determine the actual current passing through the electrode 100. This feedback is provided to the central controller 104, which may be programmed to on-line adjust the welding parameters and the wire feed speed to ensure system stability (i.e. a constant arc voltage and ODPP).

Example 1

With reference to FIGS. 3a and 3b, the implementation of the method of the present invention utilizing the above-referenced experimental set-up and parameters is graphically demonstrated. The current is maintained at an experimentally pre-determined level of 220 amperes for a pre-determined duration of approximately 12 milliseconds to grow the droplet to the desired diameter (i.e. $0.8 \leq D_d/D_w \leq 1.4$). Upon reaching the preferred size, the current is lowered to 50 amperes (at t=3 ms on FIG. 3a). Thus, the excite-up level is about 170 amperes (that is, the difference between the higher and lower current levels that is required to induce oscillation in the droplet).

As can be appreciated from viewing FIG. 3b and the accompanying illustration of the droplet/electrode tip, the change in the vertical coordinate demonstrates that the reduction in current has induced an oscillation in the droplet. This oscillation is monitored using the above-described image processing system 110/laser-optic system 116. When the droplet is moving toward the workpiece, the current is increased approximately 170 amperes to 220 amperes (FIG. 3a, t=16–18 ms). The droplet is nearly instantaneously detached from the electrode (see FIG. 3b, t=18 ms). The pulse is then reset and begins with the growth period/peak current. As should also be appreciated from viewing FIG. 3b, no significant droplet oscillation occurs during the growth period (t=18 ms to t=30 ms). This ensures that the droplet is not inadvertently detached.

Example 2

Figures 4A, 4B:
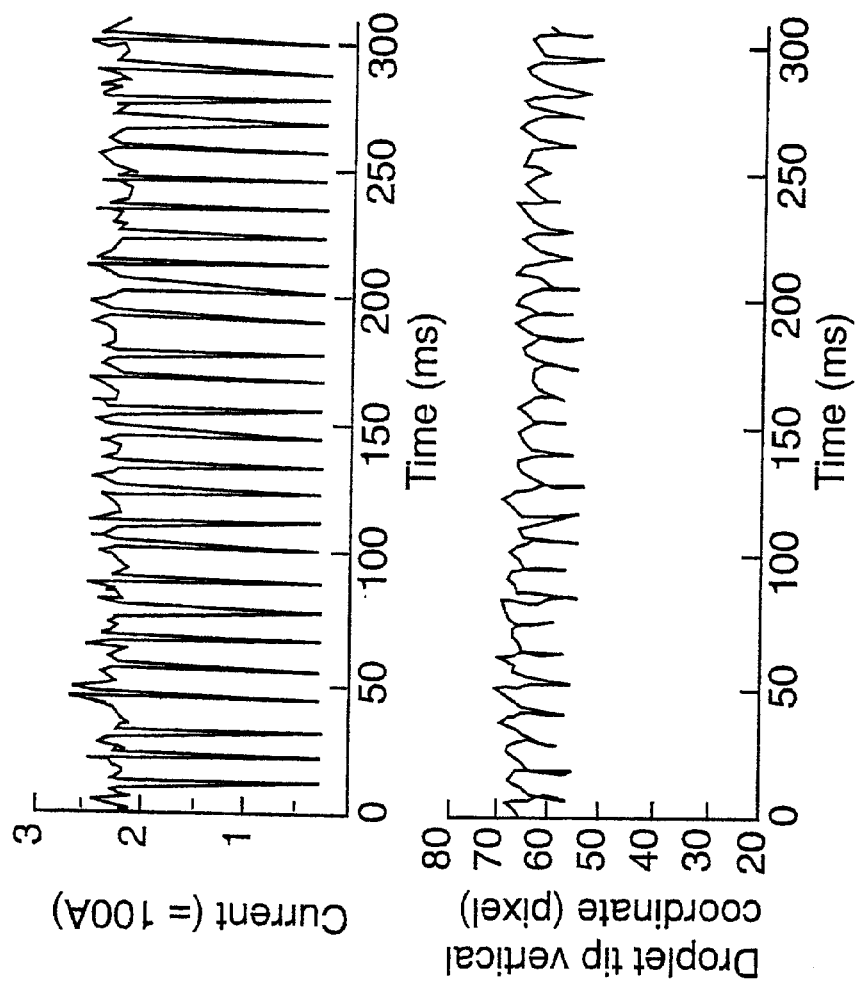

FIGS. 4a, 4b and 5a, 5b demonstrate the experimental results using the proposed method to produce different droplet sizes and different transfer frequencies, while maintaining a substantially constant average current. In FIGS. 4a and 4b, the selected duration of the peak current causes the droplet to grow to approximately 1.08 millimeters ($D_d/D_w$= 0.9) then detach by the active control action (that is, the reduction and subsequent increase in current). As can be seen in FIG. 4b, a single droplet is consistently detached for each pulse of current. However, instead of the normal transition current required to detach the droplet for the above-described parameters (approximately 350 amperes), the peak current level is only 220 amperes. The base current for this experiment is 40 amperes.

In FIGS. 5a and 5b, an increase in the duration of the peak current causes the droplet to grow to 1.68 millimeters ($D_d/D_w$=1.4) prior to detachment. This also causes the pulse period to increase which, in turn, decreases the droplet transfer frequency. Thus, larger droplets are created that detach more slowly.

However, it can be seen in FIG. 5b that droplet detachment is actively controlled and, thus, occurs only at desired instants in time when the current level is increased to at or near the peak current level. Thus, as should now be appreciated, the excite-up and cut-off levels can be fixed for a given set of welding conditions, but the duration of the peak current is adjustable to control droplet size and transfer frequency. It should also be appreciated that the base level of current necessary to induce the oscillation in the droplet endures for a very short time and, therefore, in both experiments the average current remains at approximately 210 amperes. This means that the droplet size and transfer frequency can be adjusted without altering the peak current level, as is required by prior art methods to achieve the same result.

Example 3

The above example demonstrates the usefulness of the method of the present invention in consistently achieving ODPP. However, it should be appreciated that the average current remains relatively high due to the short duration of the base current. As such a high average current is not acceptable for some welding applications, the method of the present invention must also actively control droplet detachment while allowing for the average current (heat input) to be adjusted downwardly for a particular application.

To lower the average current, a base level of current may be inserted after the cut-off level and prior to the start of the peak current without significantly affecting the amplitude of oscillation, the regularity of droplet detachment, or the droplet size at the time of detachment. FIG. 6a shows the addition of this extended base current prior to the peak current. While utilizing the same peak and base current levels as those used in Example 2 (220 amperes and 40 amperes), the addition of the base current duration advantageously reduces the average current to 83 amperes. Despite the addition of this base current period, it should be appreciated from viewing FIG. 6b that ODPP transfer is consistently achieved.

Example 4

Figure 7A:
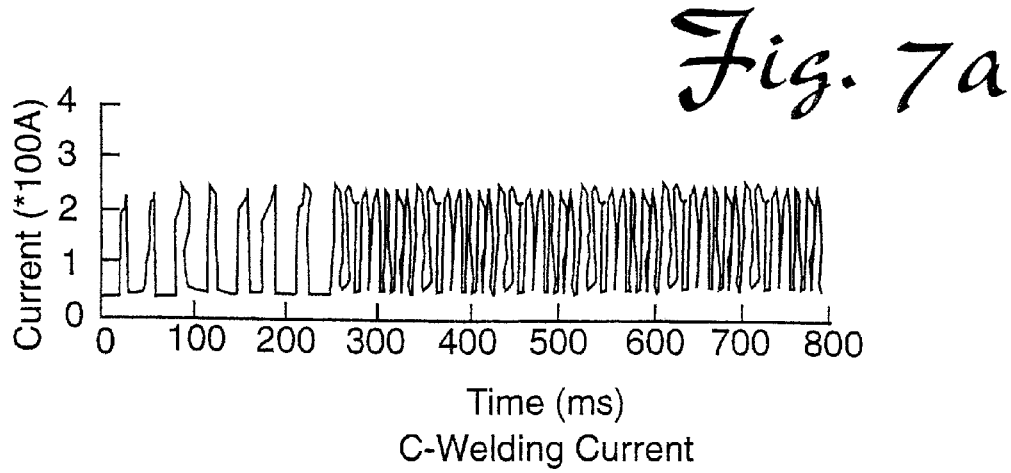
FIGS. 7a and 7b are similar pairs of graphs showing experimental results wherein the average current is changed on-line, as set forth in Example 4.
Figure 7A:
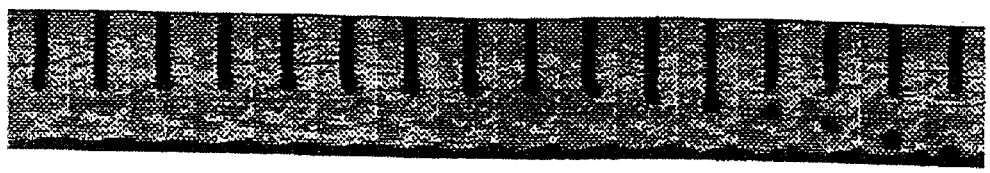
Figure 7B:
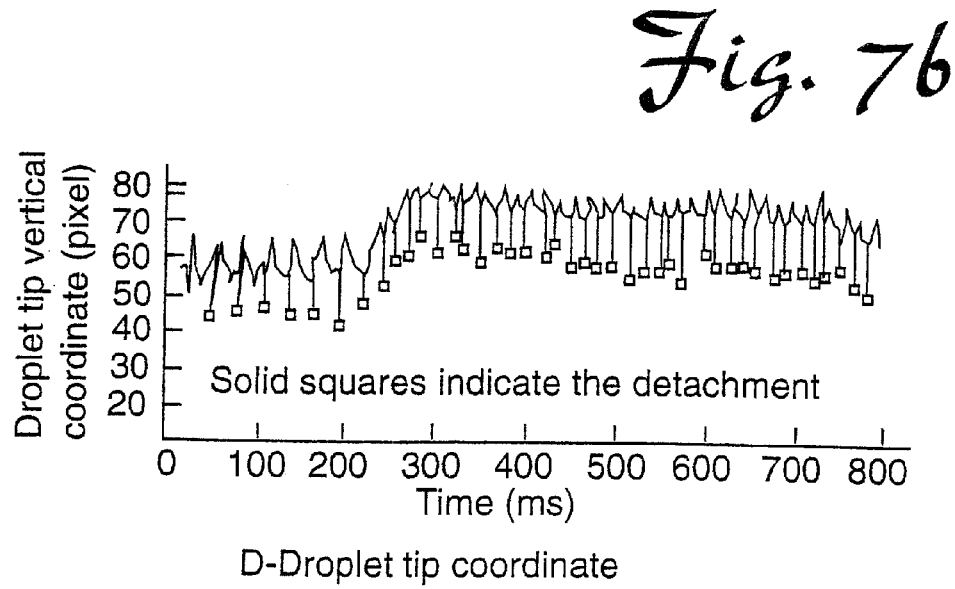
Figure 7B:
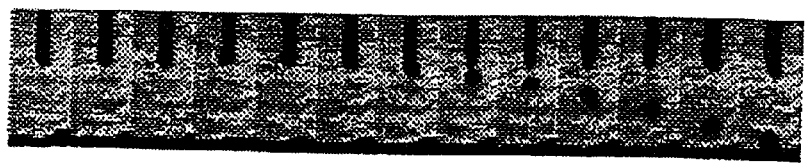

This example is similar to Examples 2 and 3, but demonstrates the ability of the system to deliver ODPP during on-line changes in the current duration to adjust the average current. Referring now to FIG. 7a, when a base current of a specified duration is inserted between the cut-off and peak current levels, the average current is experimentally determined to be 100 amperes. The peak current is maintained constant at 220 amperes for a duration of 2.8 milliseconds. Of course, as described above, the addition of the base current duration does not affect droplet detachment, as can be appreciated from viewing FIG. 7b between time t=0 and t=250 milliseconds.

At approximately t=250 milliseconds, the base current duration is removed, thereby decreasing the pulse period and increasing the average current to 165 amperes. The peak current duration is maintained at 2.8 milliseconds. As is demonstrated in FIG. 6b, while this reduction in the pulse period increases the metal transfer frequency, ODPP is still consistently achieved.

Example 5

This example demonstrates the efficacy of monitoring the arc voltage to determine the detachment instant, as opposed to using auxiliary machines to visually monitor the droplet coordinate/geometry. It should be appreciated, however, that in order to verify the reliability of the arc voltage as an accurate predictor of droplet oscillation, such visual monitoring devices are necessary.

Figures 8A, 8B:
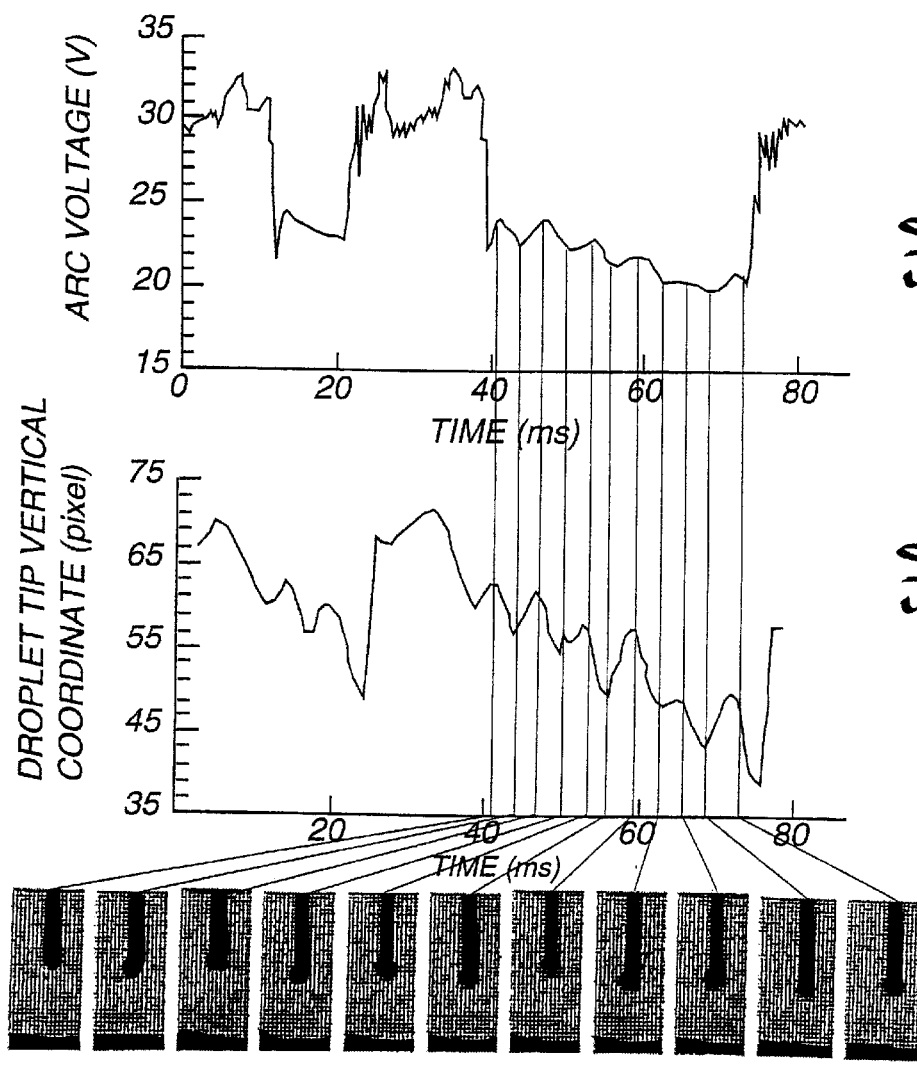
FIGS. 8a and 8b are graphs showing experimental results wherein the arc voltage is monitored to determine the beneficial amplitude for droplet detachment, as set forth in Example 5.

For purposes of this experiment, the current is adjusted in accordance with the active control method of effecting droplet detachment described above. As can be seen in FIG. 8b, upon reducing the current by the "excite-up" level, an oscillation is induced in the droplet, which is shown by the variations in the vertical coordinate of the droplet. As oscillation occurs toward and away from the workpiece, the arc length increases and decreases. As can be seen in FIG. 8a, the arc voltage follows a similar pattern. Thus, it should now be understood that by monitoring the arc voltage, the oscillation and, thus, the phase match, can be determined without the need for any additional hardware.

Thus, as demonstrated by the above examples, for a selected electrode material/diameter, the excite-up and cut-off current levels can be experimentally pre-determined and remain roughly fixed throughout the welding operation. This is true despite changes in the duration of the peak and base currents. Thus, using the above-described method, the durations of the current levels can be adjusted to change the droplet size, droplet transfer frequency, or to lower the average current (heat input), as may be required by a particular welding operation. This adjustability is beneficial in that it ensures that the method is effective over a broad range of welding conditions.

More particularly describing these adjustments, and as discussed briefly in Example 3, it should be appreciated that changes in welding conditions may require an increase or reduction in the average current. For example, if the wire feed speed increases a significant amount, the average current must increase to provide sufficient heat to melt the wire. To compensate for an increase in feed speed, the duration of the base current will likely be shortened. Although this serves to increase the average current, the result is a reduction in the duration of the pulse period. Of course, this means that more pulses occur per unit time and, thus, the droplets detach more rapidly. It should be appreciated that although the droplet transfer frequency increases, the increase in the average current can ensure that a constant arc voltage is maintained, which is necessary to provide stability and consistency to the welding operation. Similarly, if the distance between the welding guide tube and the workpiece (also known as the contact tube-to-work distance) is changed, such as during manual GMAW, or if the shielding gas composition or flow rate is significantly altered, the average current must be adjusted to maintain a constant arc voltage/length.

Thus, although the condition of ODPP may still be achieved despite changes in the duration of the base or peak currents, this alters the pulse period and results in a non-constant droplet transfer frequency. To maintain a constant pulse duration and, thus, ensure a constant droplet transfer frequency, a computer implemented method of controlling the waveform of the pulse of current to adapt to changes in the welding conditions and an accompanying system for implementing this adaptive control method are provided.

Figure 9:
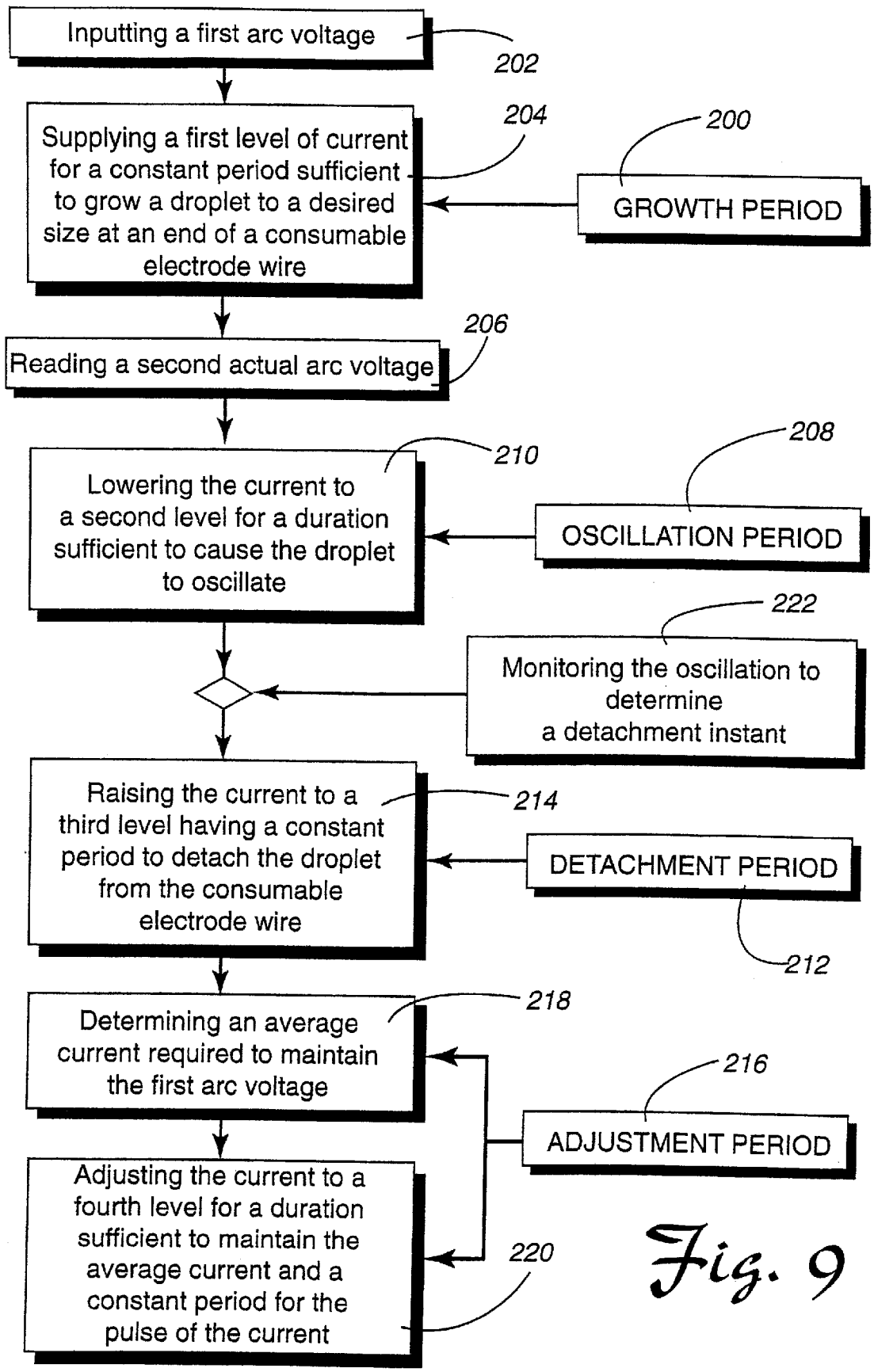
FIG. 9 is a block diagram showing the steps of a preferred embodiment of the improved computer-implemented method of the present invention.

As shown by the block diagram in FIG. 9, the method generally utilizes the steps of the above-described method of active droplet detachment (i.e. supplying a current during a growth period to grow the droplet 14, lowering the current during an oscillation period to cause the droplet to oscillate 18, and raising the current during a detachment period to detach the droplet 24). However, in addition to the growth, oscillation, and detachment periods described above, the pulse waveform is now divided into four distinct periods. For purposes of illustration these are: a growth period 200 wherein a first arc voltage is set 202, a current waveform is provided that is sufficient to grow the droplet 204, and a second actual arc voltage is sampled 206; an oscillation period 208 wherein the current waveform is sufficient to induce an oscillation in the droplet and allow the oscillation to reach a high, or beneficial, amplitude 210; a detachment period 212 wherein the current waveform is raised for a duration sufficient to detach the droplet 214; and an adjustment period 216 wherein the average current necessary to maintain the pre-set first arc voltage is determined 218 and the current waveform is adjusted to provide an average current necessary to maintain the average current 220. Also, as with the active control method, the step of monitoring the oscillation of the droplet is also included 222 between the oscillation and detachment periods.

Figure 10:
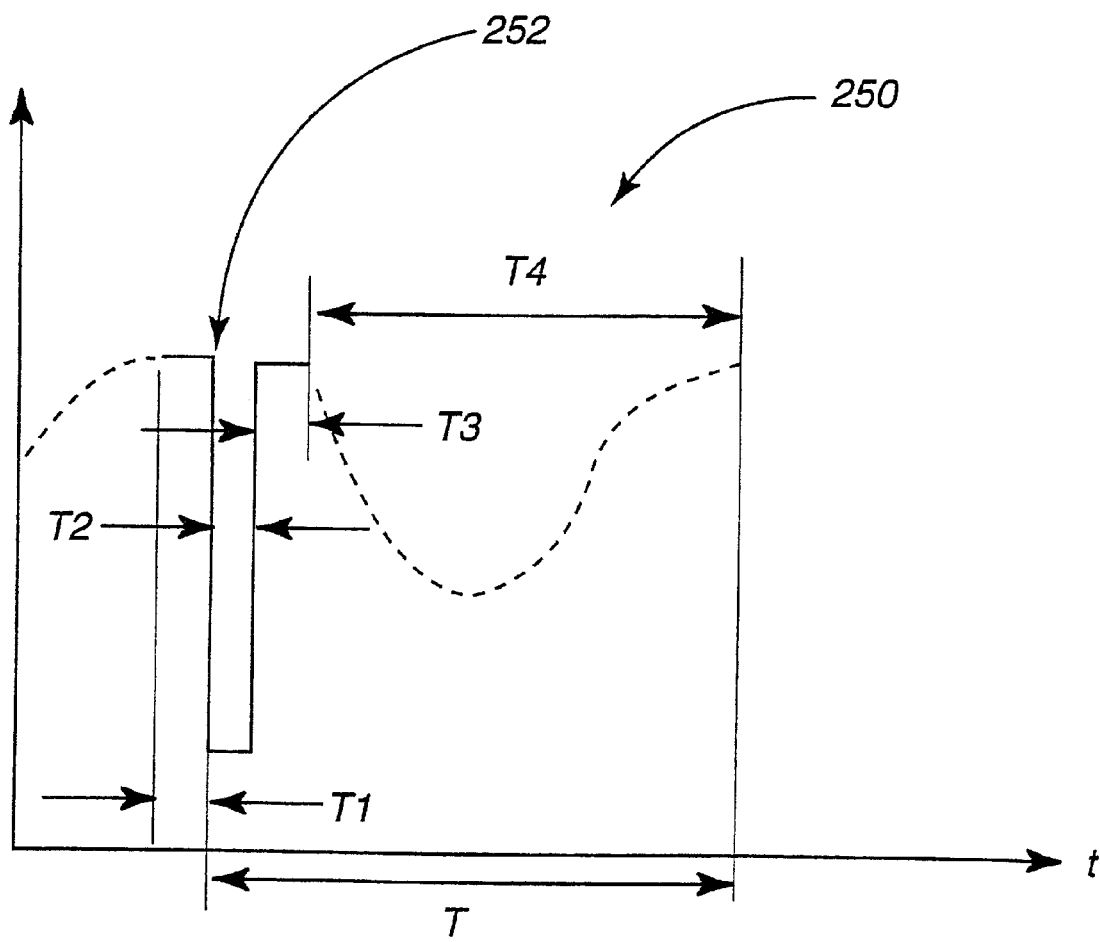
FIG. 10 is a graphical representation of a sample current waveform for implementing the computer-implemented method of the present invention.

Referring now to FIG. 10, the waveform of a single pulse of current 250 is shown. During the first period $T_1$, the current is at a peak value. This causes the droplet to grow to the desired size. As described above, this level and duration of current are experimentally determined, and can be inputted into the computer implementing the method as expressions of the first, or set-point, arc voltage, the initial, or set-point wire feed speed, and a set of pulse parameters for the current waveform. However, it should be appreciated that the duration of this growth period is constant. At the end of this first growth period $T_1$, the arc voltage is sampled 252.

Upon reaching the desired droplet size (i.e. $0.8 \leq D_d/D_w \leq 1.4$), the second, oscillation period $T_2$ begins wherein the current is lowered to induce, or excite-up, an oscillation in the droplet. While the level of current during this second period $T_2$ is generally dictated by the principles of the above-described method (i.e. the excite-up level), the duration is non-constant. This allows adjustment to ensure the beneficial amplitude is always reached for a given droplet size.

A third period $T_3$ follows wherein the current is increased to a pre-determined level (i.e. the "cut-off" level) for a specified, constant duration that is sufficient to detach the droplet from the electrode. The increased electromagnetic force associated with this increase in current, coupled with the motion of the droplet toward the workpiece, causes detachment to occur.

After detachment, the difference between the arc voltage sampled at 252 after the growth of the droplet (i.e. at the highest peak current) and the pre-set arc voltage is determined. Based on this difference, an average current required to maintain the arc voltage at a constant level is calculated. The level and duration of current is then altered during the fourth adjustment period $T_4$ as necessary to both maintain the average current and provide a constant pulse period T. As should be appreciated, the level of current during this period is variable, but is at all times kept below the transition current. The duration of the current may, however, be shortened or lengthened as necessary to adjust for any variations in the duration of the second, oscillation period, while maintaining a constant pulse period T. The process is then repeated with the first growth period $T_1$, having a pre-set peak current and duration and the sensing of the arc voltage 252.

Figure 11:
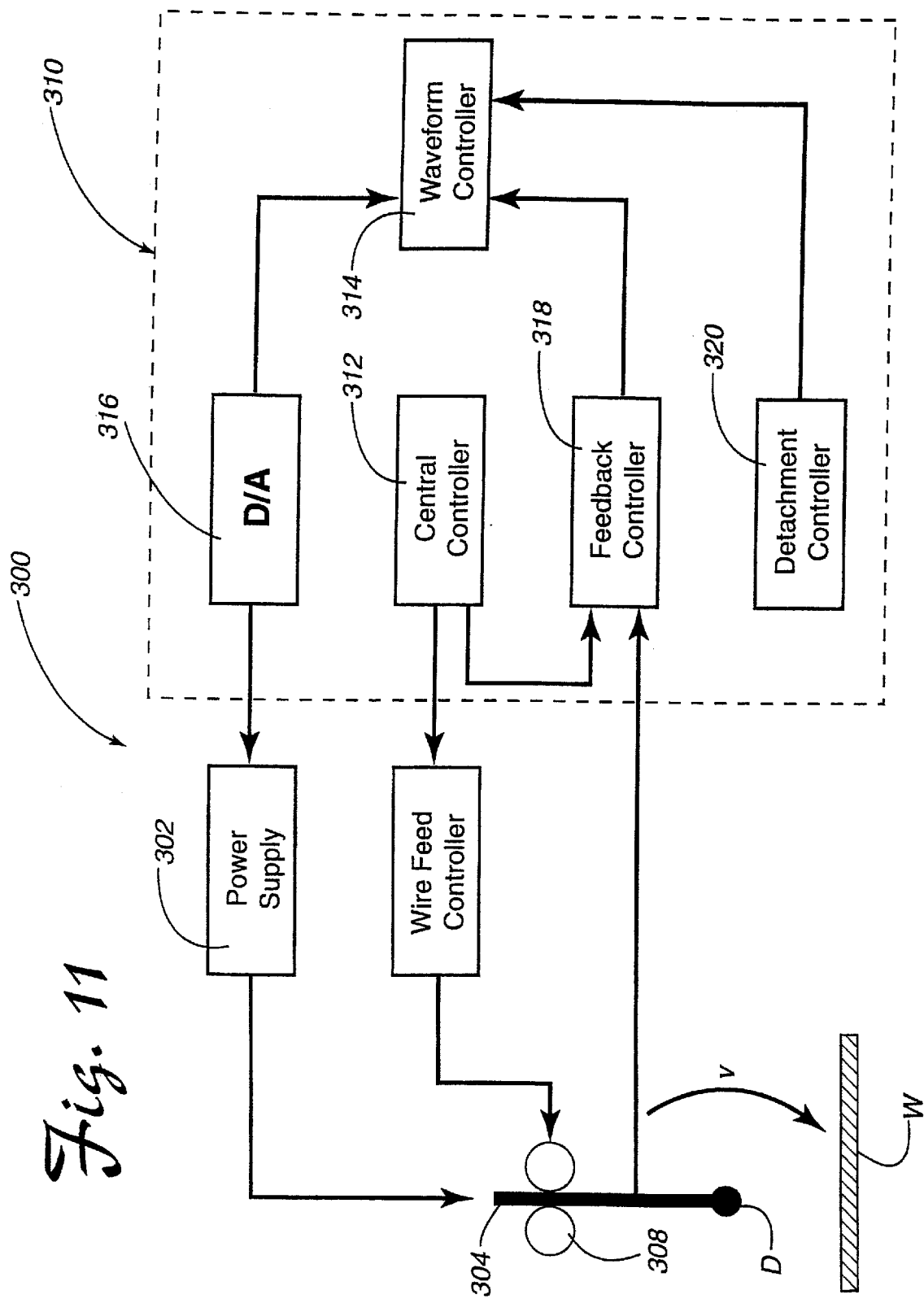
FIG. 11 is a schematical representation of the system of the present invention for adaptive welding that allows for the current waveform to be on-line adjusted, while maintaining a substantially constant droplet transfer frequency.

A preferred embodiment of the system 300 used to implement the above-described adaptive welding method is shown in FIG. 11. This system 300 includes a power supply 302 for providing a current to the electrode wire 304, a wire feed controller 306 for varying the feed speed of the electrode using a motor 308, and a controller 310 for adjusting the current waveform. In the preferred embodiment, the controller 310 further includes a central controller 312 for receiving the pre-determined first arc voltage V, the initial feed speed for the electrode wire 304, and the set of pre-determined initial pulse parameters to achieve ODPP based on the given welding conditions. The central controller 312 is connected to the wire feed controller 306 and provides the initial feed speed such that the first arc voltage is maintained.

A waveform controller 314 receives the initial pulse parameters from the central controller 312 and determines a current waveform, such as that shown in FIG. 10. The signal generated by the waveform controller 314 is converted by a digital-to-analog converter 316 prior to being transmitted to the power supply 302. This waveform is sufficient to grow the droplet, but remains below the transition current to ensure that the droplet is not independently detached.

After the droplet D grows to the desired size, the second arc voltage V' is read by a feedback controller 318. Based on the difference between the arc voltage V' and the desired first arc voltage V, the feedback controller 316 then calculates the required average current to maintain a constant arc voltage. This calculated value is transmitted to the waveform controller 314, which uses the value to determine whether adjustments to the current waveform are required to maintain system stability, as described below.

In accordance with the principles described above, the waveform controller 314 then adjusts the current waveform in accordance with the preset parameters to induce an oscillation in the droplet D. To ensure that the method of active control is results in ODPP transfer, the oscillation of the droplet D must be monitored. However, instead of the visual monitoring systems (i.e. the laser-optic and the image processing systems) described above, and in accordance with an important aspect of the present invention, a detachment controller 320 serves to monitor the arc voltage V' and signals the waveform controller 314 to increase the current at a specified instant when the droplet D is known to move toward the workpiece W. This sudden increase in current causes detachment of the droplet D. The droplet then transfers to the workpiece W to form the weld bead (not shown).

Upon detachment of the droplet D, the waveform controller 314 receives a signal from the feedback controller 318, which includes the calculated average current. The waveform controller 314 then designs the current waveform necessary to maintain the average current and signals the power supply 302 to raise or lower the current required to maintain the average current. The process is then repeated with the first growth period having a pre-set peak current and duration and the sensing of the arc voltage by the feedback controller 316 substantially at or near the end of this period.

Advantageously, by utilizing a host computer (e.g. an IBM Compatible model having a central processing unit, a memory, and any suitable media-input capabilities as the controller, the above-described system components (i.e. the central controller, waveform controller, feedback controller, and detachment controller) can actually be written as a series of program instructions, such as individual software modules or subroutines. An example of such computer program instructions for use on such a computer have been developed as copyrighted software entitled "Software for Control System for Gas Metal Arc Welding," the full disclosure of which is incorporated herein by reference. The use of this computer program facilitates the application of the methodology described above for receiving the initial parameters, designing a current waveform for achieving ODPP and a constant droplet transfer frequency, and also for responding to variations in welding conditions by reading the arc voltage during the welding operation and adjusting the current waveform accordingly.

Example

In this example, the above-described system 300 is used to implement the adaptive control methodology of the present invention, including a host computer receiving instructions from the above-referenced software program as the controller 310. It has been experimentally determined that by adjusting the current waveform in accordance with the above-described principles of adaptive control, the wire feed speed may be increased a significant degree while a constant droplet transfer frequency is maintained.

For purposes of this experiment, a mild steel electrode having a diameter of 1.2 millimeters is used. The shielding gas is 95 percent argon and 5 percent carbon dioxide. The first arc voltage is preset to 30.5 volts. Also, the initial wire feed speed is set at 106 inches per minute. The initial pulse parameters are set as follows: peak current—240 amperes; first period current duration—2 milliseconds; base current 40 amperes (excite-up level—200 amperes); second period duration—variable between 2 milliseconds and 3 milliseconds, depending on the desired droplet size; cut-off level—200 amperes; third period current duration—3.5 milliseconds. Of course, both the level and duration of current during the fourth period are adjustable to provide the desired average current/constant pulse period.

Figure 12A:
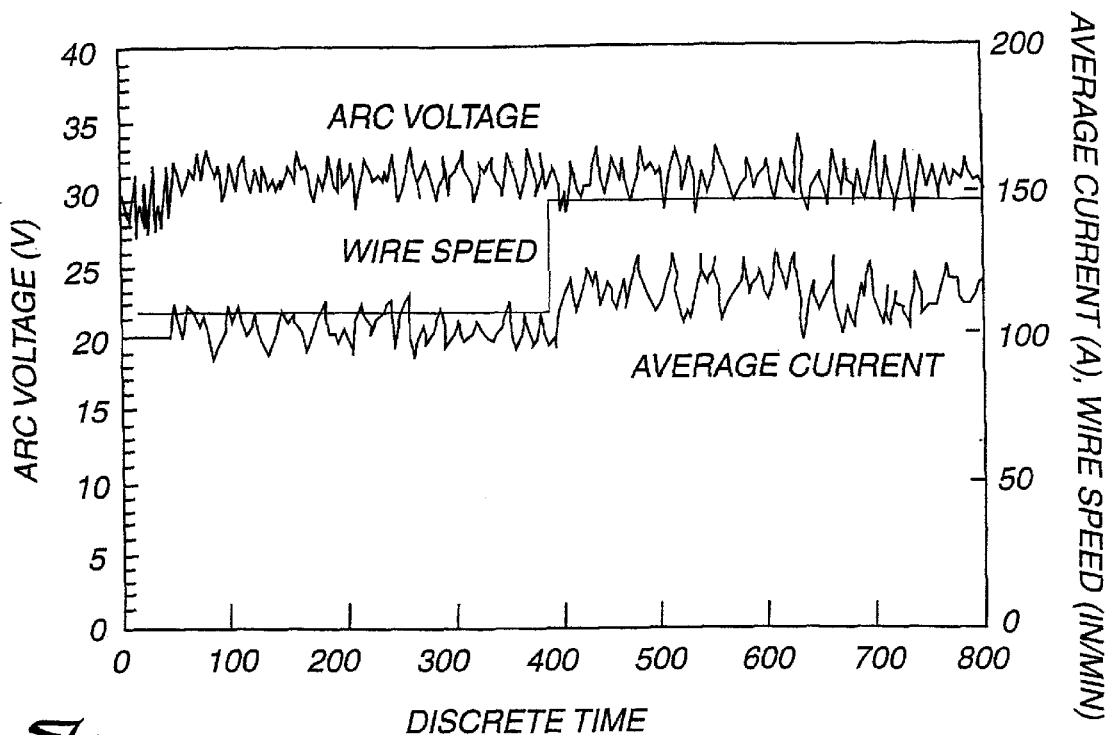
FIGS. 12a and 12b are graphs showing an experiment wherein the wire feed speed is increased and the average current is raised to accommodate this increase without affecting the droplet transfer frequency.
Figure 12B:
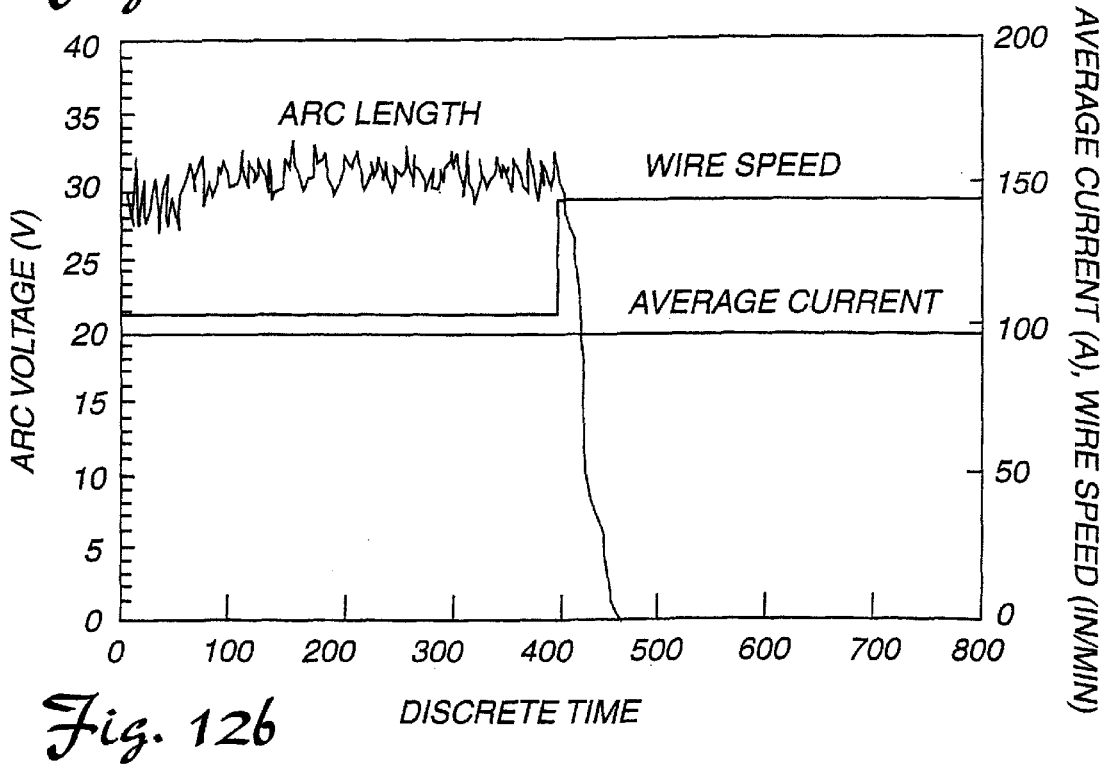

Referring now to FIGS. 12a and 12b, it can be seen that if the wire feed speed is increased to 146 inches per minute at t=400 ms and the average current is not on-line adjusted to compensate for this change, the system will fail. This failure, of course, means that droplets are not detached and thus, ODPP is not achieved.

If, however, the waveform of the current is adjusted to provide a higher average current (i.e. an increased current during the adjustment period) while maintaining a constant pulse period, the arc voltage can be maintained at a constant level, despite the increase in wire feed speed. Importantly, it was experimentally determined that the droplet transfer frequency both before and after the increase in wire feed speed was maintained at a constant rate of 33 Hz.

Thus, as can be appreciated, despite significant changes in the wire feed speed, the control system of the present invention can always maintain a stable welding process (i.e. ODPP, a constant metal transfer frequency, and a constant arc voltage). Similar experiments also verify that the system is adaptable to changes in the contact tube-to-work distance, which allows for precise droplet control in manual welding operations, and variances in shielding gas flow rate or composition.

In summary, numerous benefits result from employing the concepts of the present invention. The improved method of GMAW includes varying the current supplied to a consumable electrode wire such that the detachment of the droplet is actively controlled. This allows for the detachment of ODPP to be achieved at lower currents and heat input levels than prior art methods of GMAW welding. Using the welding process of the present invention, the current is sufficient to produce a droplet at the end of the electrode wire, but is not sufficient to independently cause detachment. After the droplet reaches a desired size, the current is lowered, which induces an oscillation in the droplet such that it moves toward and away from the workpiece. The current is then increased, and the combination of droplet momentum with the increased electromagnetic force causes the droplet to detach from the electrode. The oscillation of the droplet can be monitored using the changes in the arc voltage to determine a precise detachment instant. Moreover, a computer implemented adaptive control method and accompanying system allows for the on-line adjustment of the current waveform to advantageously: (1) compensate for anticipatable variations in the welding conditions; (2) achieve ODPP transfer; and (3) maintain a constant pulse period.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of welding a workpiece using a consumable electrode wire melting by the heat of an electric arc having a voltage, comprising the steps of:

supplying a current sufficient to produce a droplet having a desired size at an end of the consumable electrode wire;

lowering the current sufficient to cause the droplet to oscillate;

monitoring the voltage of the arc during the oscillation of the droplet to determine a detachment instant; and raising the current at the detachment instant sufficient to detach the droplet from the consumable electrode wire, whereby the detachment of the droplet is actively controlled.

2. The method of arc welding according to claim 1, further including the step of utilizing the electromagnetic force of the raised current and the momentum created by the oscillation of the droplet to detach the droplet.

3. The method of arc welding according to claim 1, wherein the consumable electrode wire has a diameter $D_w$, the droplet has a diameter $D_d$, and the desired size of the droplet upon said step of lowering the current is such that $0.8 \leq D_d/D_w \leq 1.4$.

4. The method of arc welding according to claim 1, further including the step of providing a gas for shielding the arc, whereby oxidation of the droplet is substantially prevented during transfer to the workpiece.

5. The method of arc welding according to claim 1, wherein the detachment instant occurs when the droplet has an amplitude of oscillation toward the workpiece.

6. A computer implemented method of adaptive arc welding using a pulse of current having a variable waveform supplied to a consumable electrode wire being fed towards a workpiece, comprising the steps of:

inputting a first arc voltage;

supplying a first level of current for a constant period sufficient to grow a droplet to a desired size at an end of the consumable electrode wire;

reading a second actual arc voltage;

lowering the current to a second level for a duration sufficient to cause the droplet to oscillate;

raising the current to a third level having a constant period sufficient to detach the droplet from the consumable electrode wire;

determining an average current required to maintain the first arc voltage; and adjusting the current to a fourth level for a duration sufficient to maintain the average current and a constant period for the pulse of current, whereby a single droplet is detached per constant pulse period to provide a constant droplet transfer frequency.

7. The computer implemented method of claim 6, wherein the step of inputting the first arc voltage further includes inputting a set of pulse parameters to maintain the first arc voltage and a feed speed for the electrode wire.

8. The computer implemented method of claim 7, wherein said set of pulse parameters include a peak current sufficient to detach the droplet and a base current sufficient to both maintain the arc and induce droplet oscillation.

9. The computer implemented method of claim 6, wherein the consumable electrode wire has a diameter $D_w$, the droplet has a diameter $D_d$, and the desired size of the droplet for said step of supplying the current is such that $0.85D_d/D_w \leq 1.4$.

10. The computer implemented method of welding of claim 6, further including the step of providing a gas for shielding the arc, whereby oxidation of the droplet is substantially prevented during transfer to the workpiece.

11. The computer implemented method of welding of claim 6, wherein the third level of current is substantially equal to the first level of current.

12. The computer implemented method of claim 6, wherein the first, second, third and fourth current levels are all below a transition current level defined as a level of current sufficiently high to independently cause detachment and transfer of the droplet having a diameter substantially equal to that of the electrode.

13. A system for welding a workpiece using a pulse of current having a constant period and a adaptively controlled variable waveform, comprising:

a consumable electrode wire;

a wire feed controller for feeding said consumable electrode wire toward the workpiece;

a power supply for providing a current sufficient to both maintain an arc between said consumable electrode wire and the workpiece and form a droplet at the end of said electrode;

a controller having a memory for receiving and storing a set of instructions, including a first voltage for said arc, an initial wire feed speed, and a current sufficient to grow said droplet to a desired size;

said controller including means for (a) reading a second arc voltage upon growing said droplet to said desired size, (b) lowering said current for a duration sufficient to induce an oscillation in said droplet, (c) raising said current sufficient to detach said droplet, (d) calculating an average current required to maintain said first arc voltage substantially constant, and (e) adjusting said current level and duration sufficient to maintain said average current and a constant period for the pulse of current, whereby a single droplet is detached per constant pulse period to provide a constant droplet transfer frequency.

14. The system of claim 13, wherein said controller is a computer for receiving program instructions from a readable medium, said program instructions including:

a central control module for receiving and setting the first arc voltage, the initial wire feed speed, and the set of pulse parameters;

a feedback control module for reading said second arc voltage and computing an average current necessary to maintain the first arc voltage;

a waveform control module for receiving instructions from said central control module to computer a current waveform to induce an oscillation in said droplet and detach said droplet;

a detachment control module for monitoring the arc voltage during the oscillation of said droplet and signaling said waveform control module to adjust the current waveform to detach said droplet;

said waveform control module receiving instructions from said feedback control module for adjusting said current waveform to maintain said average current such that said arc voltage remains substantially constant.

15. A system for arc welding a workpiece using a pulse of current having an adaptively controlled variable waveform, comprising:

a consumable electrode wire;

a wire feed controller for feeding said electrode wire towards the workpiece;

a power supply for supplying a current sufficient to maintain an arc between said electrode wire and the workpiece, the heat of said arc forming a droplet at the end of said wire electrode;

a central controller for setting a first arc voltage, an initial wire feed speed and a set of parameters for the pulse of current to maintain said first arc voltage;

a waveform controller for implementing a first constant pulse period of peak current based on the initial parameters sufficient to grow said droplet to a desired size and a second variable pulse period of base current sufficient to cause said droplet to oscillate;

a feedback controller for reading a second arc voltage and comparing the second arc voltage with the first arc voltage, said feedback controller further determining an average current required to maintain said first arc voltage and providing the average current to said waveform controller;

a detachment controller for monitoring the arc voltage to determine the oscillation of said droplet and signaling said waveform controller to implement a third constant period of current sufficient to detach said droplet;

said waveform controller providing a fourth variable pulse period of variable current to maintain both the average current and a constant pulse period, whereby a single droplet is detached per constant pulse period to provide a constant droplet transfer frequency.

* * * * *